J. P. SHEEHAN, J. J. MURRAY & A. BOOTH.
COMBINED SADDLE AND EXPANSION JOINT.
APPLICATION FILED JUNE 3, 1909.
998,926.
Patented July 25, 1911.
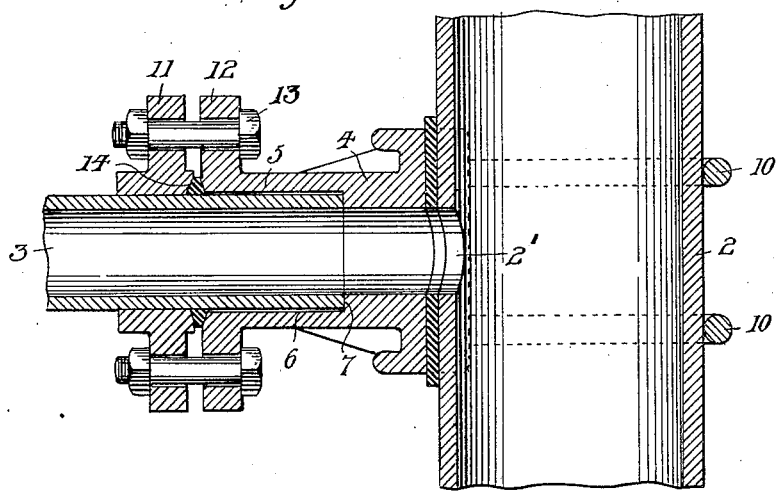
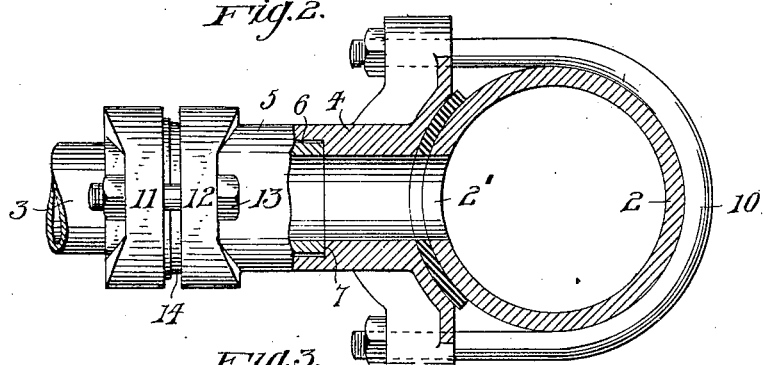
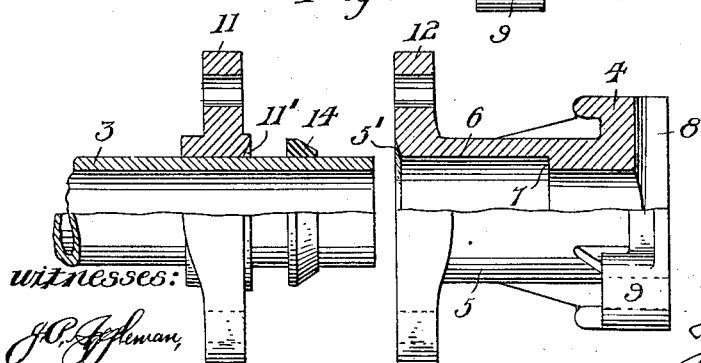

UNITED STATES PATENT OFFICE.

JOHN PATRICK SHEEHAN, JOHN J. MURRAY, AND ARTHUR BOOTH, OF PITTSBURG, PENNSYLVANIA.

COMBINED SADDLE AND EXPANSION-JOINT.

998,926. Specification of Letters Patent. Patented July 25, 1911.

Application filed June 3, 1909. Serial No. 499,896.

*To all whom it may concern:*

Be it known that we, JOHN P. SHEEHAN, JOHN J. MURRAY, and ARTHUR BOOTH, residents of Pittsburg, in the county of Allegheny and State of Pennsylvania, have invented certain new and useful Improvements in Combined Saddles and Expansion-Joints, of which the following is a specification.

The purpose of this invention is to dispense with the usual threaded connection between the end of a service pipe and the saddle which unites it with the main, whereby the union is made more effective and at the same time caused to do duty as an expansion joint, thus dispensing with such separate joint heretofore required, and materially reducing the cost of service pipe connections.

A further advantage is that with a clamp as distinguished from a screw connection, thinner pipe may be used than heretofore, as no threads are cut thereon.

A further object of the invention is to enable the connection to be employed between pipes having unflanged communicating openings whereby it is unnecessary to cast pipes in any particular form with a view to providing for a connection and unnecessary to subsequently provide flanges at the openings for the engagement of connecting bolts.

In the accompanying drawings, Figure 1 is a central section of the improved connection taken longitudinally of the main. Fig. 2 is a cross section of the main and a portion of the saddle, the remainder of the connection being in elevation. Fig. 3 illustrates the parts of the connection separated and partly in section.

Referring to the drawing, 2 designates a gas or water main, and 3 a service pipe leading therefrom. The means for connecting the pipe to the main consists of a saddle 4, having a tubular extension 5, formed with a smooth bore 6 having shoulder or offset 7. The face of saddle 4 is curved at 8 to fit main 2 around service opening 2', and is cast with apertured lugs 9 to receive the extremities of the main-embracing yokes 10.

The smooth or unthreaded end of pipe 3 is entered in bore 6 and abuts against offset 7. For thus holding the pipe a ring like plate or clamping member 11 is movable thereon, and is secured to flanges 12 of extension 5 by bolts 13, with a rubber ring 14 or other suitable packing clamped between it and the extremity of the saddle extension, the packing being compressed in depressions 11' and 5', respectively, of the connected parts, whereby the clamping plate may be drawn quite close to the saddle and the packing practically inclosed and protected, and at the same time providing an effective seal.

As the service pipe may move in the tubular saddle extension, as when expanding and contracting, the improved connections dispense with the usual expansion joint interposed in the service pipe. A further advantage is the economy resulting from the use of thinner pipe as no threads are cut thereon, also the expense of cutting threads on the pipe and in the saddle is avoided.

What we claim is:

1. The combination with a main pipe and a branch pipe to be connected, said pipes having unflanged openings and extending at right angles to one another, of a connecting member independent of both pipes and comprising in an integral metallic structure a saddle portion at one end fitted to the main pipe, a pipe-telescoping portion formed with an interiorly disposed stop portion, said pipe-telescoping portion formed with an exteriorly flanged portion, independent clamping means passing around the main pipe to positively clamp the saddle portion thereto, and means for expansibly connecting the branch pipe to the telescoping portion comprising a separable clamping member on the branch pipe, and means connecting said clamping member and the flanged portion.

2. The combination with a main pipe and a branch pipe to be connected, said pipes having unflanged openings and extending at right angles to one another, of a connecting member independent of both pipes and comprising in an integral metallic structure a saddle portion at one end fitted to the main pipe, a pipe-telescoping portion formed with an interiorly enlarged portion and a stop shoulder, said pipe-telescoping portion formed at its outer end with an exteriorly flanged portion, independent pressure clamping means passing around the main pipe to positively clamp the saddle portion thereto, and means for expansively connecting the branch pipe to the telescoping portion comprising a separable clamping member on the branch pipe, means connecting said clamping member and the flanged portion, and a packing held between said clamping member and the outer end of the telescoping portion.

3. The combination with a main pipe and a branch pipe to be connected, said pipes having unflanged openings and extending at right angles to one another, of a connecting member independent of both pipes and comprising in an integral metallic structure a saddle portion at one end fitted to the main pipe and provided with apertured lugs, a pipe-telescoping portion formed with an interiorly enlarged portion and a stop shoulder, said pipe-telescoping portion formed at its outer end with an exteriorly apertured flanged portion and with a recessed seat, independent pressure clamping means passing around the main pipe to positively clamp the saddle portion thereto, and means for expansibly connecting the branch pipe to the telescoping portion comprising a separable apertured clamping member on the branch pipe, means connecting said clamping member and the flanged portion, and a packing located in the recessed seat and held between the clamping member and the outer end of the telescoping portion.

In testimony whereof we affix our signatures in presence of two witnesses.

JOHN PATRICK SHEEHAN.
JOHN J. MURRAY.
ARTHUR BOOTH.

Witnesses:
A. C. WAY,
J. M. NESBIT.

Copies of this patent may be obtained for five cents each, by addressing the "Commissioner of Patents, Washington, D. C."